United States Patent [19]
Shirai et al.

[11] Patent Number: 5,282,143
[45] Date of Patent: Jan. 25, 1994

[54] METHOD AND SYSTEM FOR MACHINING A SCULPTURED SURFACE

[75] Inventors: Kenji Shirai, Yokohama; Shingo Akasaka, Zushi; Toshiyuki Shirabe, Yokohama, all of Japan

[73] Assignee: Hitachi, Ltd., Tokyo, Japan

[21] Appl. No.: 719,911

[22] Filed: Jun. 24, 1991

[30] Foreign Application Priority Data

Jun. 27, 1990 [JP] Japan ................................ 2-166729

[51] Int. Cl.$^5$ ............................................. G06F 15/46
[52] U.S. Cl. ........................... 364/474.29; 364/474.2; 364/474.24
[58] Field of Search .................. 364/474.18, 474.17, 364/474.26, 474.2, 474.24, 474.28, 474.29, 474.22, 474.35

[56] References Cited

U.S. PATENT DOCUMENTS

| | | | |
|---|---|---|---|
| 4,789,931 | 12/1988 | Kuragano et al. | 364/474.18 |
| 4,825,377 | 4/1989 | Seki et al. | 364/474.29 |
| 4,866,631 | 9/1989 | Kuragano et al. | 364/474.29 |
| 5,033,005 | 7/1991 | Haske | 364/474.29 |
| 5,043,906 | 8/1991 | Jepson | 364/474.2 |
| 5,121,334 | 6/1992 | Riley et al. | 364/474.2 |

OTHER PUBLICATIONS

Journal of Precision Engineering vol. 54, No. 5, "Machining System based on Inverse Offset Method", Kondo et al., May 1988, pp. 167-172.

Primary Examiner—Jerry Smith
Assistant Examiner—Steven R. Garland
Attorney, Agent, or Firm—Antonelli, Terry, Stout & Kraus

[57] ABSTRACT

An object of the present invention is to provide a practical method for machining a sculptured surface. One of the characteristics of a concrete method for machining a sculptured surface so as to accomplish the object is that a patch table of a sculptured surface as surface information data for sculptured surface machining is configured so that a tool path can be generated using the inverse offset method for various surfaces such as a Bézier surface or a Ferguson surface and another characteristic is that over cutting during tool path generation on the basis of the inverse offset operation can be corrected.

6 Claims, 18 Drawing Sheets

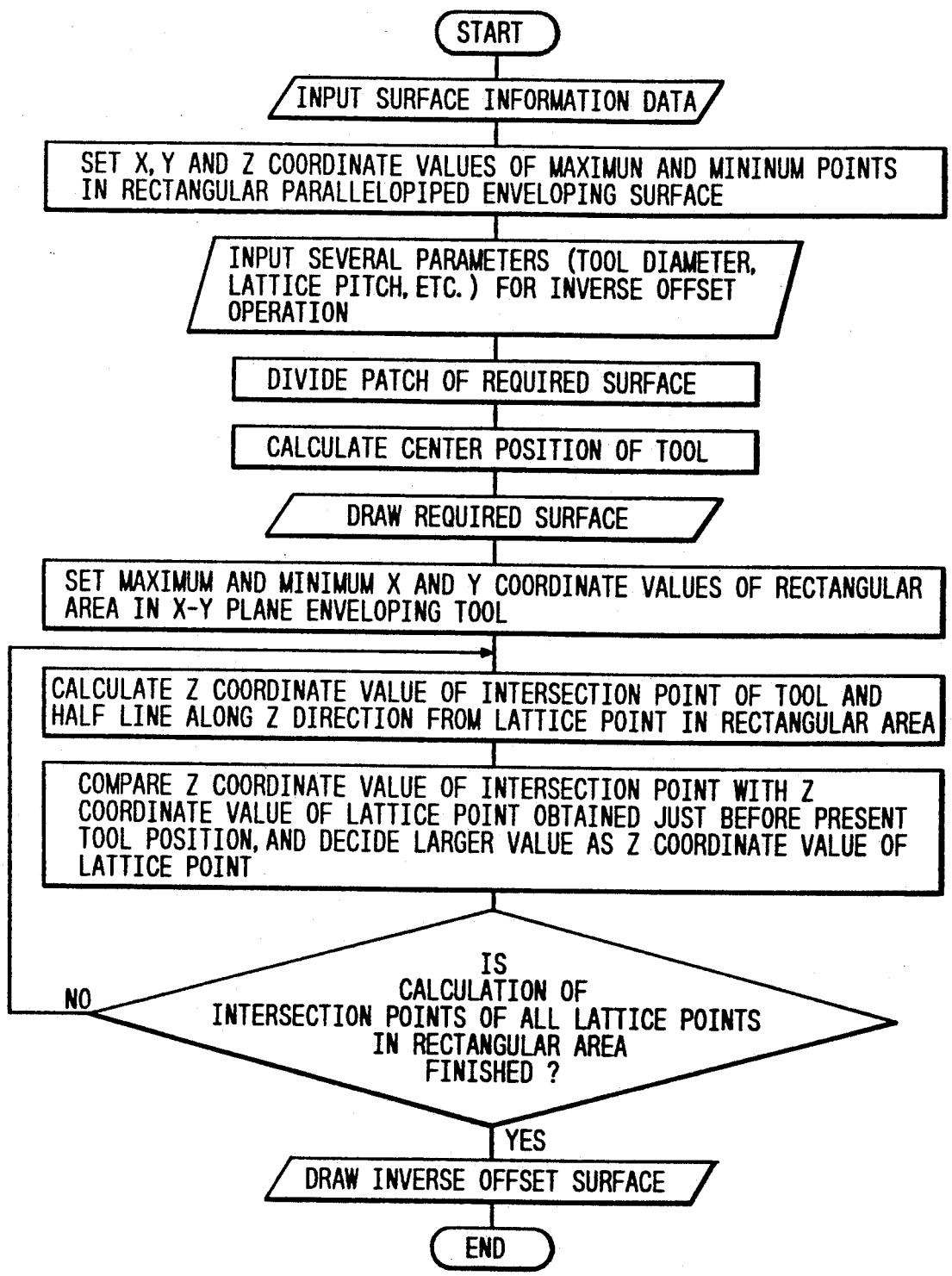

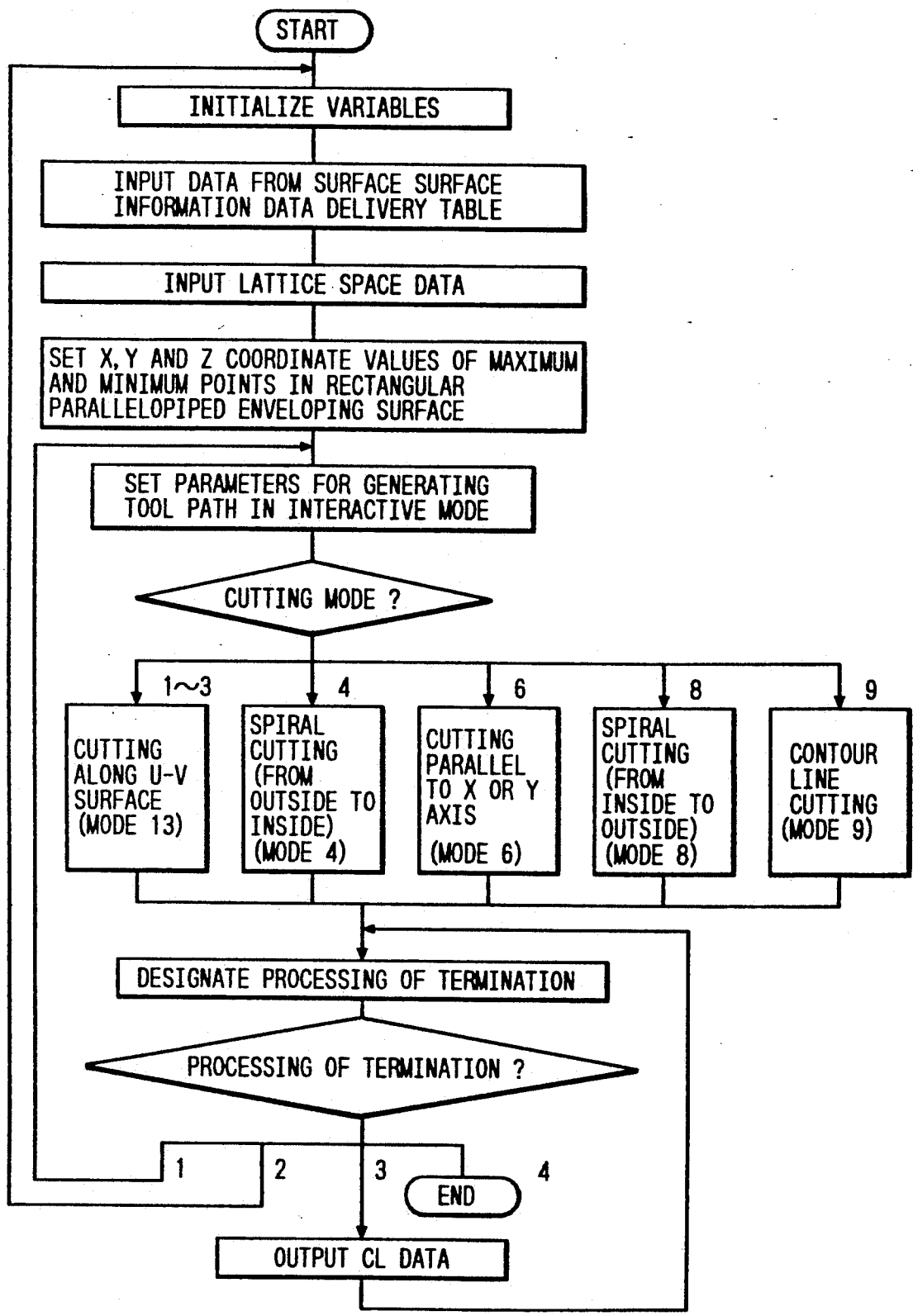

FIG. 5A

100 MANAGEMENT TABLE

| SURFACE TABLE POINTER | PATCH TABLE POINTER | PATCH POINT TABLE POINTER | KNOT TABLE POINTER | SEGMENT POINTER | SEGMENT TABLE POINTER |
|---|---|---|---|---|---|
| 1 | 2 | 3 | | | |

| INT | INT | INT |
|---|---|---|
| TOTAL NUMBER OF TABLES | NUMBER OF USED TABLES | TOP POINTER |

INT=COUNTED BY 4 BYTES AS ONE UNIT

FIG. 5B

200 SURFACE TABLE

| FIRST SURFACE | SECOND SURFACE | 3 | 4 | 5 | 6 | n-TH SURFACE |
|---|---|---|---|---|---|---|
| 1 | 2 | 3 | 4 | 5 | 6 | 7 |

| INT | INT | INT | INT | INT | INT | INT |
|---|---|---|---|---|---|---|
| ATTRIBUTE | NUMBER OF PATCHES | TOP PATCH | NUMBER OF PATCHES IN u-DIRECTION | NUMBER OF PATCHES IN v-DIRECTION | NUMBER OF BOUNDARY SEGMENT | BOUNDARY SEGMENT |

→ PATCH TABLE

→ SEGMENT TABLE

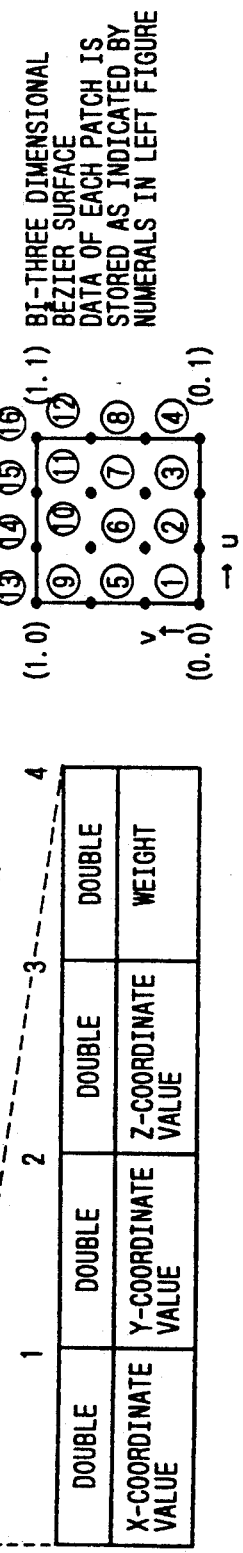

FIG. 5E

500 KNOT TABLE

| FIRST KNOT | SECOND KNOT | ... | n-TH KNOT |
|---|---|---|---|

| DOUBLE | DOUBLE |
|---|---|
| PARAMETER VALUE | NUMBER OF MALTIPLEX |

FIG. 5F

600 SEGMENT TABLE

| FIRST SEGMENT | SECOND SEGMENT | ... | n-TH SEGMENT |
|---|---|---|---|

| | 1 | 2 | 3 | 4 | 5 | 6 | 7 |
|---|---|---|---|---|---|---|---|
| | INT | INT | INT | INT | INT | INT | INT |
| | TYPE | DIMENSION | NUMBERS OF CONTROL POINTS | POINT OF TOP CONTROL POINT | NUMBER OF KNOTS | NUMBER OF TOP KNOTS | PATCH IN SCULPTURED SURFACE |

→ SEGMENT POINT TABLE (column 4)
→ KNOT TABLE (column 6)
→ PATCH TABLE (column 7)

WHEN B SPLINE OR NURBS IS USED (columns 5–6)

2:LINE
4:BÉZIER

LINE
BEZIER SURFACE
RATIONAL BÉZIER
B SPLINE
NURBS

700 SEGMENT POINT TABLE

| FIRST POINT | SECOND POINT | ... | N-TH POINT |
|---|---|---|---|

| DOUBLE | DOUBLE | DOUBLE |
|---|---|---|
| u COORDINATE VALUE | v COORDINATE VALUE | WEIGHT |

FOR RATIONAL BÉZIER

FIG. 10A
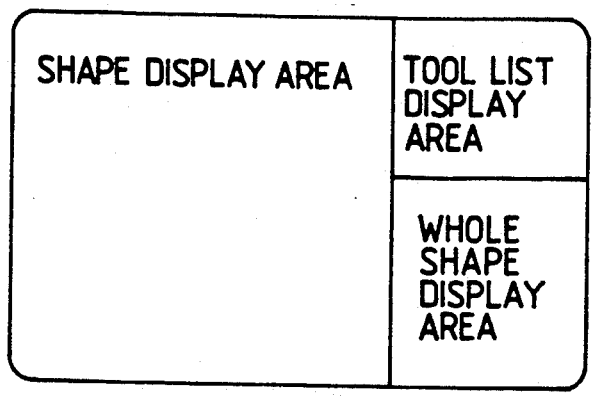
FIG. 10B
OPERATION
101 DISPLAYING SHAPE
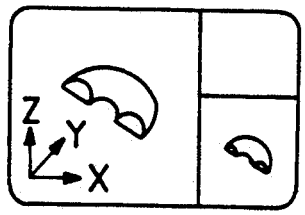
102 CHANGING VIEW POINT
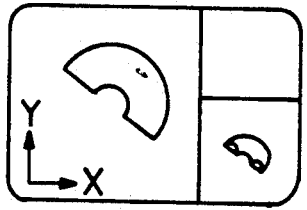
103 DISPLAYING SECTION
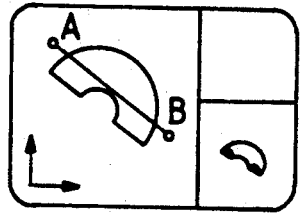
DESIGNATE TWO POINTS A, B THROUGH MOUSE
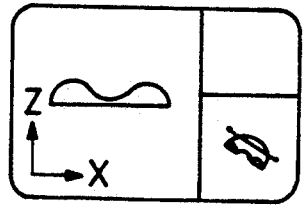
TO FIG. 10C

FIG. 12

| DIE PART | | HOLE | GUIDE POST UNIT | SUB-GUIDE POST UNIT | STRIPPER BOLT UNIT | PLATE CLAMP BOLT | KNOCK PIN | PILOT UNIT | GUIDE PIN UNIT | LIFTER PIN UNIT | EJECTOR PIN UNIT | MISFEED DETECTION UNIT | ROUND PUNCH CUTTING EDGE HOLE |
|---|---|---|---|---|---|---|---|---|---|---|---|---|---|
| PLATE | | LOWER DIESET | △ | ○ | | | | | | | | | ○ |
| | | UPPER DIESET | △ | ○ | ○ | | | | | | | | △ |
| | | DIE PLATE | | ○ | | ○ | ○ | ○ | | | | ○ | ○ |
| | | DIE PLATE BACKING PLATE | | ○ | ○ | ○ | △ | ○ | △ | | | ○ | △ |
| | | STRIPPER PLATE | | △ | ○ | ○ | ○ | △ | ○ | ○ | | ○ | ○ |
| | | STRIPPER PLATE BACKING PLATE | | ○ | ○ | ○ | △ | ○ | | ○ | ○ | ○ | △ |
| | | PUNCH PLATE | | △ | | ○ | ○ | △ | ○ | ○ | ○ | ○ | |
| | | PUNCH PLATE BACKING PLATE | | ○ | | ○ | △ | ○ | ○ | | | ○ | |
| | | GUIDE PLATE | | | | | | | | | | | |
| DIE BUSH | | TUBULAR | | | | ○ | | ○ | | | | | |
| | | DEFORMED | | | | ○ | △ | ○ | | | | | |
| | | SEGMENT | | | | | | | | | | | |
| STRIPPER BUSH | | TUBULAR | | | | ○ | | | | | | | |
| | | DEFORMED | | | | ○ | △ | | | | | | |
| | | SEGMENT | | | | | | | | | | | |

○ : FINISHING MACHINING   △ : NEEDS FINISHING ALLOWANCE

I) SORTING-Y

NUMERALS DENOTE MACHINING ORDER AFTER SORTING.
• DENOTES CENTER POSITION OF MACHINING.

II) GROUPING

⊙ DENOTES STANDARD FOR SETTING RANGE.
☐ DENOTES RANGE OF EACH GROUP. IN THIS EXAMPLE, THREE GROUPS ARE PRODUCED. ORDER OF GROUPS MEANS MACHINING ORDER OF GROUPS.

III) SORTING-X

NUMERALS DENOTE MACHINING ORDER IN EACH GROUP.
...... DENOTES LOCUS OF TOOL.

5,282,143

METHOD AND SYSTEM FOR MACHINING A SCULPTURED SURFACE

BACKGROUND OF THE INVENTION

The present invention relates to a method for machining a sculptured surface of a metallic, ceramic, or plastic material, and, more particularly, to a method for machining a sculptured surface suited to improving the machining accuracy and efficiency using the inverse offset method which is effective as a tool path generation method.

The conventional tool path generation method of the sculptured surface machining method for various tool shapes has not been perfected, though a solution has been proposed only for the spherical tool shape.

It has been proposed to reduce offset surfaces for various tool shapes and the "inverse offset method" for solving tool interference processing with necessary accuracy, "Machining System based on Inverse Offset Method", Journal of Precision Engineering, Kondo, et al, Vol. 54, No. 5, May 19, 1988, pp 167-172.

The concept of the inverse offset method is shown in FIG. 14, in an offset surface can be generated by the enveloping surface of a cutting edge when an inverse tool moves on a surface with a required shape.

In the above prior art, the offset surface generation principle for the sculptured surface no consideration is given to the configuration of a final sculptured surface machining system; the correction method for generation of an offset surface on the basis of the inverse offset method; the actual machining accuracy of sculptured surface machining and an actually required memory reduction method for realizing a machining system in a computer; and the selection method for an appropriate tool, and there are problems imposed for realizing an actual machining system.

SUMMARY OF THE INVENTION

The object of the invention is to provide a correction method for generation of an offset surface on the basis of the configuration of a sculptured surface machining system and the inverse offset method, a reduction method for a lattice memory in the inverse offset method, and an automatic selection method for tools in view of calculating tool path generation information for machining a sculptured surface by realizing a practical sculptured surface machining method.

The configuration of a sculpture surface machining method related to the present invention for solving the above problems wherein in a sculptured machining is proposed for inputting surface information data, forming an offset surface on the basis of the tool shape data, and generating a tool path so as to machine a three-dimensional sculptured surface, with an operation instruction being transferred to machine tools so as to allow the machine tools to perform a machining operation by using a machining information processing system which is constructed by the inverse offset method.

The sculptured surface machining system inputs surface information data, performs an inverse offset operation, generates a tool path, outputs the tool path data, and finally outputs the numerical control (NC) information. In this case, a tool path can be generated for a generated offset surface either by the inverse offset method or by the general offset method.

The sculptured surface machining system can be applied to all sculptured surfaces such as Bézier, Ferguson, Coons, rational Bézier, B-Spline, NURBS, and Gregory surfaces. Input data includes surface information data and conditions for the inverse offset operation and tool path generation processing, and can be inputted in the interactive or batch mode. The display function is performed for a required shape, an inverse offset surface, or a tool path.

In the inverse offset surface generation method, an error, for example, over cutting against the true offset surface may occur depending on the setting method for the lattice pitch and search step width (FIGS. 6 and 7). Therefore, a coordinate value of the center position of the tool from the machining point on the required surface for the inverse offset surface which is calculated, this Z value (value in the Z axis direction) and the Z value calculated by the inverse offset operation are compared, and the larger Z value is set as a value of the new inverse offset surface. The problem of over cutting of the required surface can be solved by this method.

The first one (FIG. 8) of the lattice memory reduction methods by the inverse offset method is a method for setting a lattice invalid area, and the second one is a method for not registering an area, which does not participate in the offset surface, in the memory as an invalid space by using the concept of a lattice block so as to reduce the memory.

As to the tool selection method, the case of sculptured surface machining and the case of 2½ dimensional (the X and Y axes and the positive quadrant of the Z axis) machining are separately considered (FIGS. 11 and 12).

For deciding the tool size from the shape of a sculptured surface, for example, in the case of a Bézier surface, a tool with a larger diameter is selected for a flat shape from the viewpoint of the characteristic of a convex hull polyhedron at the control point of the sculptured surface or for an uneven shape, a tool with a diameter corresponding to the unevenness is selected. In the case of 2½ dimensional machining, data of a plurality of tools of many types is registered in a file and read from the main unit of the CAM system at a high speed.

BRIEF DESCRIPTION OF THE DRAWINGS

FIG. 3 is an operation flow chart of an inverse offset operation shown in FIG. 2;

FIG. 4 is an operation flow chart of tool path generation shown in FIG. 2;

FIGS. 5A to 5G are schematic block diagram of surface information data shown in FIG. 2;

FIGS. 10A to 10D are schematic view of the tool selection function and procedure for sculptured surface machining;

FIG. 12 is a diagram for deciding the die machining method;

DETAILED DESCRIPTION OF THE PREFERRED EMBODIMENTS

Figure 1:
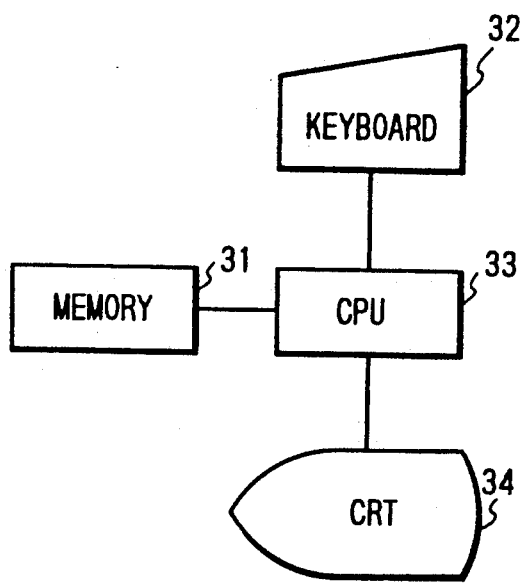
FIG. 1 is a block diagram of a computer.
Figure 2:
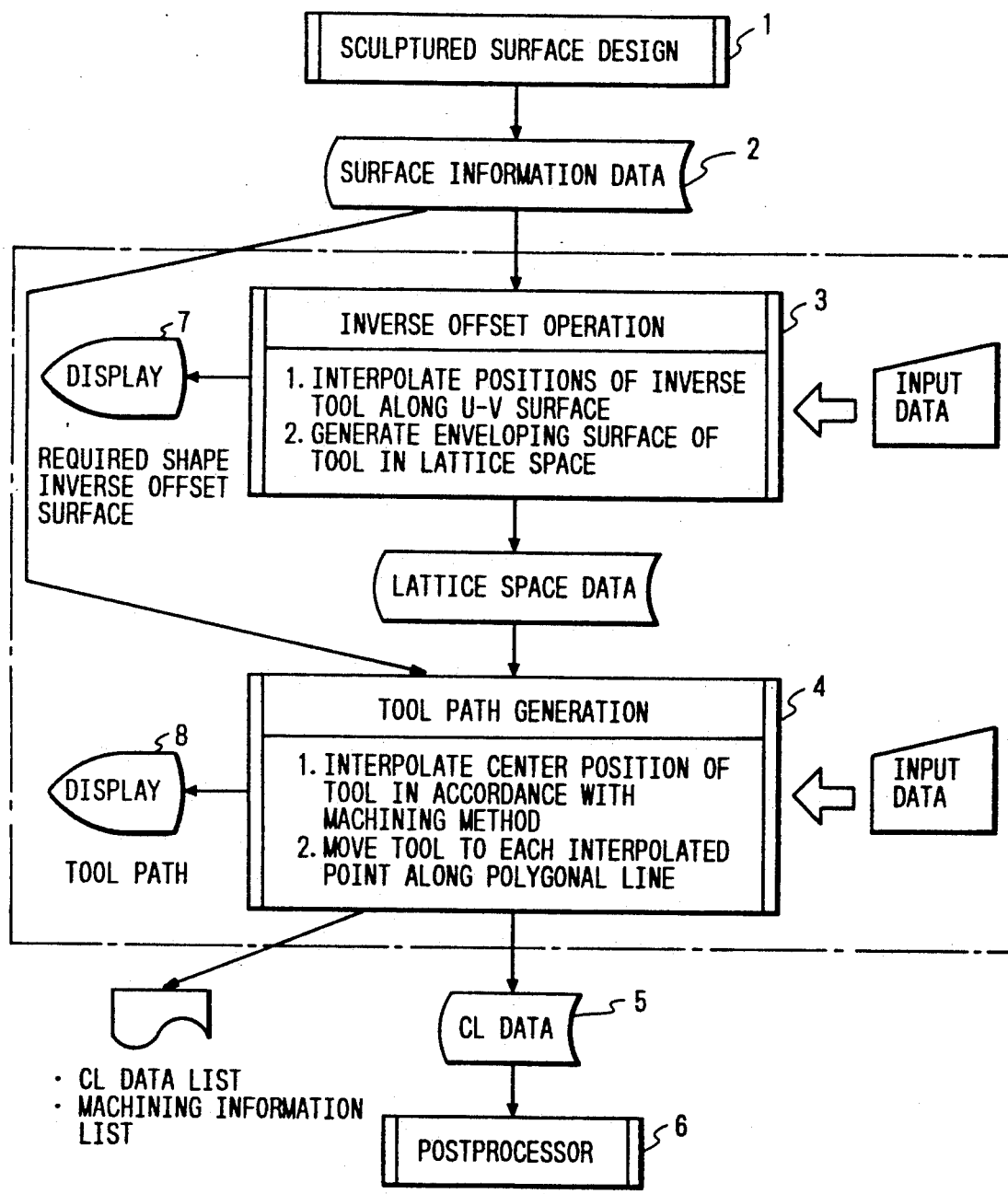
FIG. 2 is a flow chart of a machining information processing system.
Figure 5G:
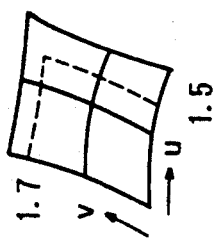

As shown in FIG. 1, a computer for use in the present invention includes a memory 31, a keyboard 32, a CPU 33, and a CRT 34. In FIG. 2, the machining information includes sculptured surface design 1, surface information data 2, inverse offset operation 3, tool path generation 4, cutter location (CL) data 5, a postprocessor 6, a display 7, (inverse offset surface), and display 8 (tool path).

The surface information data 2 determined by the sculptured surface design 1 is stored in the memory 31. When the machining conditions such as cutting speed and machining mode are entered from the keyboard 32, operations are performed by the CPU on the basis of the flow chart of FIG. 2, and the tool path is displayed on the CRT 34. In FIG. 2, the inverse offset operation 3 and the tool path generation processing 4 are performed using the surface information data 2 determined by the sculptured surface design 1 as input data, and the cutter location data 5 is outputted. When the cutter location data 5 is inputted to the postprocessor 6, numerical control (NC) information is outputted. The operation shown in FIG. 3 reads the surface information data 2 and the machining condition data such as lattice pitch and tool diameter, moves the inverse tool along the U-V surface (surface indication by the sculptured surface indication method) on each input surface, and generates an enveloping surface of the tool in the lattice space. The operation shown in FIG. 4 inputs the surface information data 2 and the lattice space data, inputs the machining conditions such as initial tool position and cutting mode from the keyboard 32 (FIG. 1), and calculates and displays the tool path on the screen on each cutting mode surface.

FIGS. 5A to 5G, schematically illustrate a management table 100, a surface table 200, a patch table 300, a patch point table 400, a knot table 500, a segment table 600, and a segment point table 700.

The type of a sculptured surface can be selected and set by specifying appropriate codes to the top of each patch and the types in the U and V directions of the patch table in patch table 300 (FIG. 5C).

As shown in FIG. 2, in the surface information data 2, when an offset surface is previously generated and given data is stored, the inverse offset operation 3 is bypassed and the data is transferred to the tool path generation processing 4 so as to generate a tool path.

The display function shown in FIG. 2 displays the inverse offset surface 7 for the required shape and the tool path 8. By using the system of this embodiment, offset surfaces corresponding to all three-dimensional sculptured surfaces can be generated.

Next, the second embodiment concerning to the correction method of an offset surface on the basis of the inverse offset method will be described.

Figure 6:
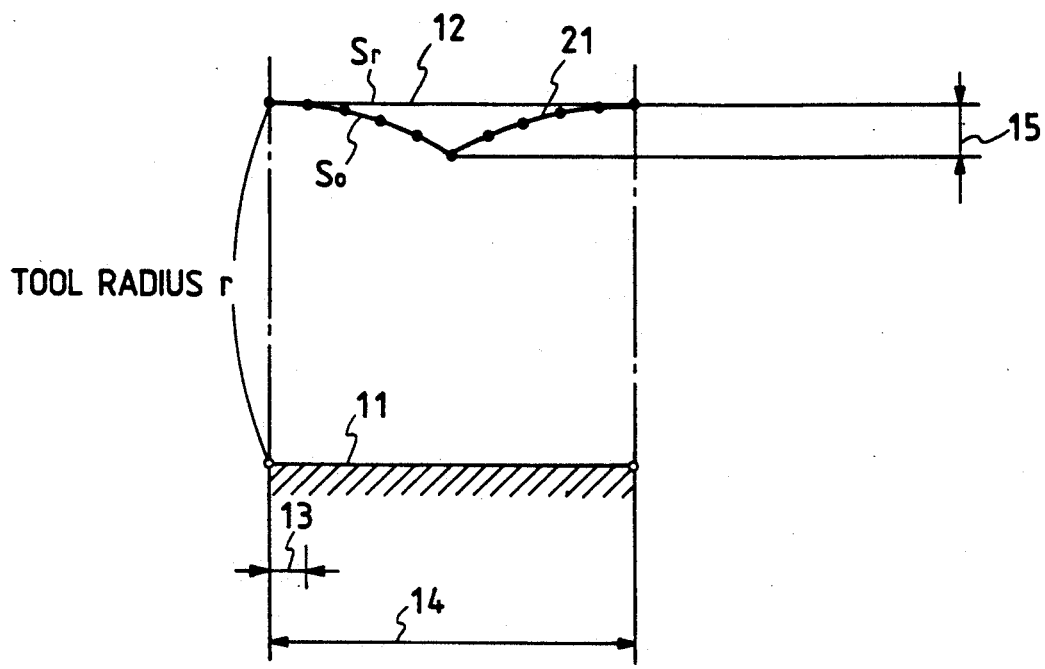
FIG. 6 is a schematic diagram of an over cutting correction method during tool path generation on the basis of the inverse offset operation.

In FIG. 6, numeral 11 indicates a required surface, 12 a true offset surface, 13 a lattice pitch, 14 a search step width, and 15 an error (over cutting) against the true offset surface. The true offset surface 12 of the required surface 11 is assumed as $S_r$ and an inverse offset surface 21 as $S_o$. In the generation method for the inverse offset surface 21 ($S_o$), an error (over cutting) against the true offset surface 12 occurs in dependence upon the setting values of the lattice pitch 13 and the search step width 14.

Figure 7:
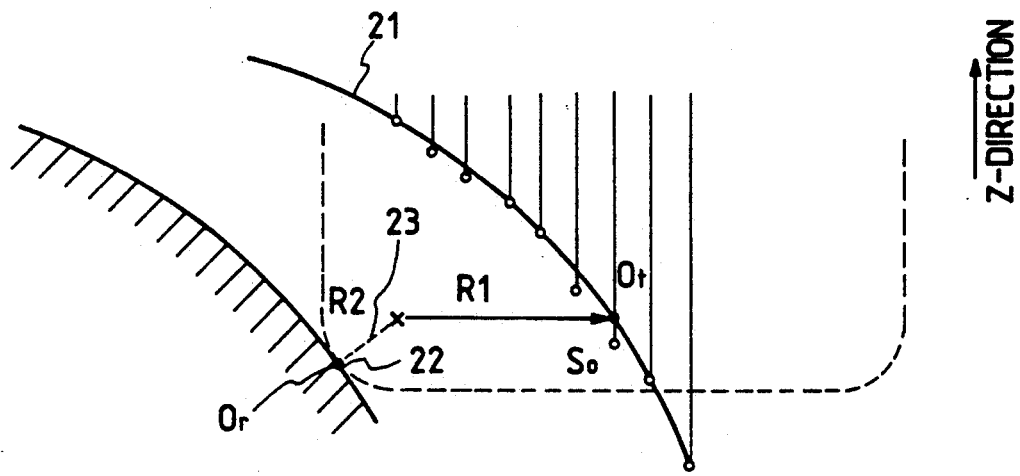
FIG. 7 is an illustration for the correction method shown in FIG. 6.
Figure 8:
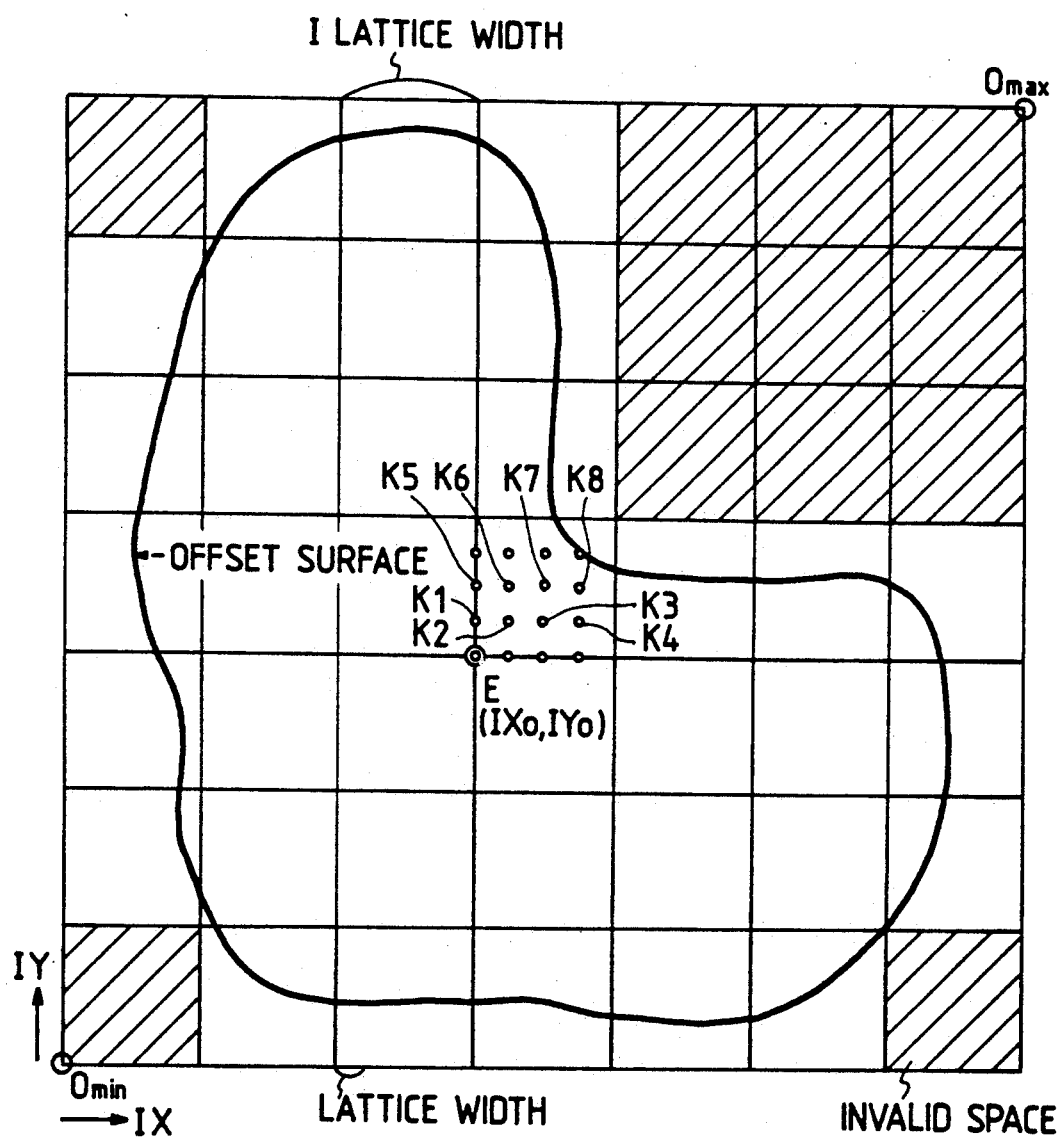
FIG. 8 is an illustration for a lattice memory reduction method by the inverse offset operation.

In FIG. 7, a coordinate value of a machining point 22 ($O_r$) on the required surface from the center of a tool corner radius 23 (R2) in the normal direction is obtained for the calculated inverse offset surface 21 ($S_o$), and furthermore, a coordinate value of the machining point 22 from the center of a tool radius R1 is calculated. The coordinate value of the Z value is compared with the Z value on the offset surface which is calculated by the inverse offset operation (the vertical direction in FIG. 7 is the Z axis), and the larger Z value is assumed as a value of the new inverse offset surface. The problem of over cutting of the required surface can be solved by this method. Over-cut workpieces are defective therefore, workpieces are required to be free of over cutting.

offset surface of a workpiece located in a three-dimensional space coordinate system (the direction perpendicular to the sheet of FIG. 8 is the Z axis).

Conventionally, the lattice width is designated and coordinate values are set uniformly in a lattice space memory. Therefore, all lattices in the coordinate system require memories and the number of memories is apt to increase enormously. So as to reduce memories for unnecessary information, a lattice block concept (lattice width I, J) is introduced in FIG. 8.

Figure 9:
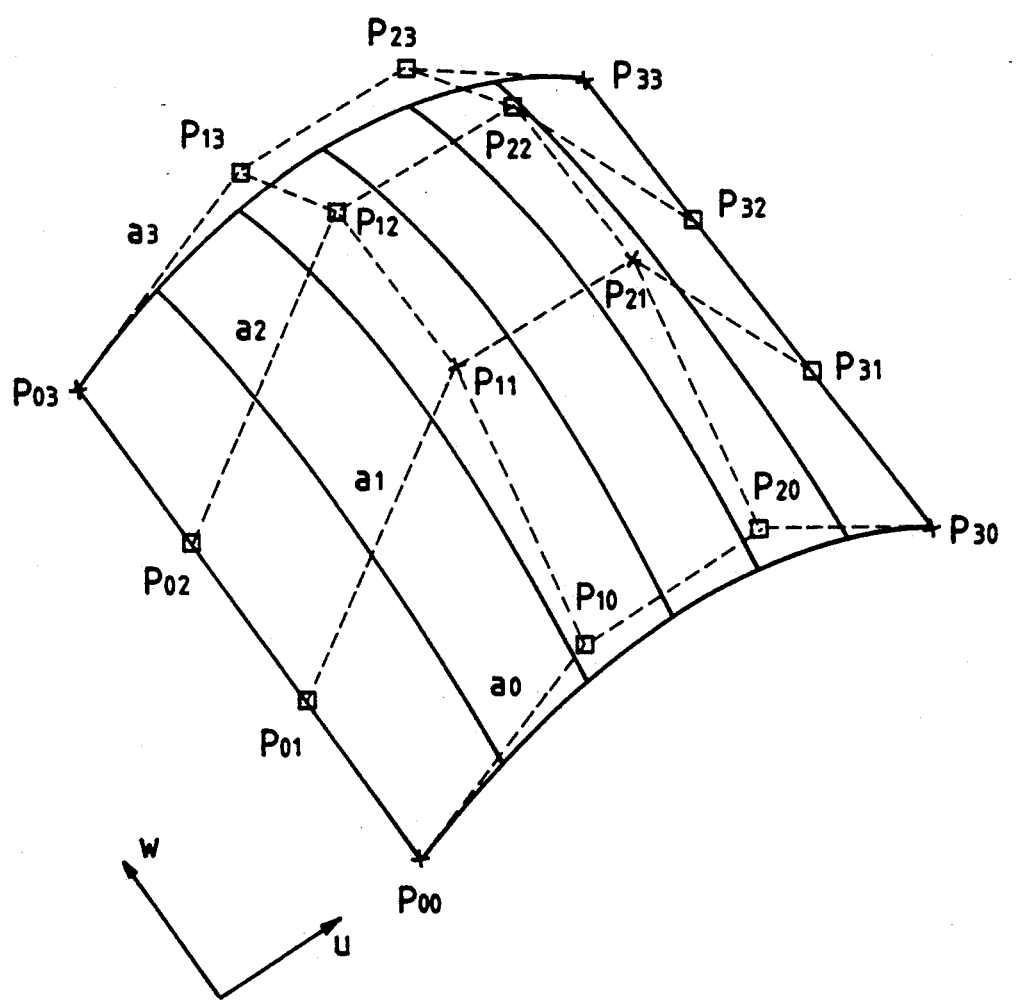
FIG. 9 is a drawing showing a convex hull polyhedron of a Bezier surface.

An area not participating in the offset surface is regarded as an invalid space and not registered in a memory. Only a block which participates in the offset surface is handled as an area for registering in a memory, and the conventional lattice width is set in this block and data is allocated to the lattice space memory. The lattice width in each lattice block is not constant and can be set freely. By doing this, many or few memories can be allocated to a complicated part or a simple part of the offset surface so as to reduce memories. Therefore, necessary memories can be allocated with necessary accuracy and a highly accurate surface can be obtained resultantly. One of the methods uses an interactive means. It is a method that an offset surface and lattice blocks are displayed on the XY plane and the lattice width of each lattice block is designated by the user. In another method, the curvature of each patch is calculated and the lattice width of each block is determined by the value of curvature. FIG. 9 is a schematic diagram showing a convex hull polyhedron of a Bézier surface, and each surface enclosed by four points Pij (00 to 33) is referred to as a patch.

The Bézier surface shown in FIG. 9, for example, has a property (convex hull polyhedron) of a convex hull polyhedron at the control point of the sculptured surface and the Bézier surface is included in a polyhedron. Therefore, by evaluating this polyhedron, whether the surface is flat or uneven can be evaluated. This method provides most suitable memory distribution.

As to the tool selection method, the fourth embodiment is considered for sculptured surface machining and the fifth embodiment for 2½ dimensional machining (the X and Y axes and the positive quadrant of the Z axis). For sculptured surface machining, tool type selection and tool size selection are available.

A flat endmill is used for rough machining and a ball endmill is used for finished machining.

So as to determine the tool size from the shape of a sculptured surface, for example, in the Bézier surface shown in FIG. 9, a tool with a larger diameter is selected for a flat shape from the viewpoint of the characteristic of a convex hull polyhedron at the control point of the sculptured surface or for an uneven shape, a tool with a diameter corresponding to the unevenness is selected.

Figure 10C:
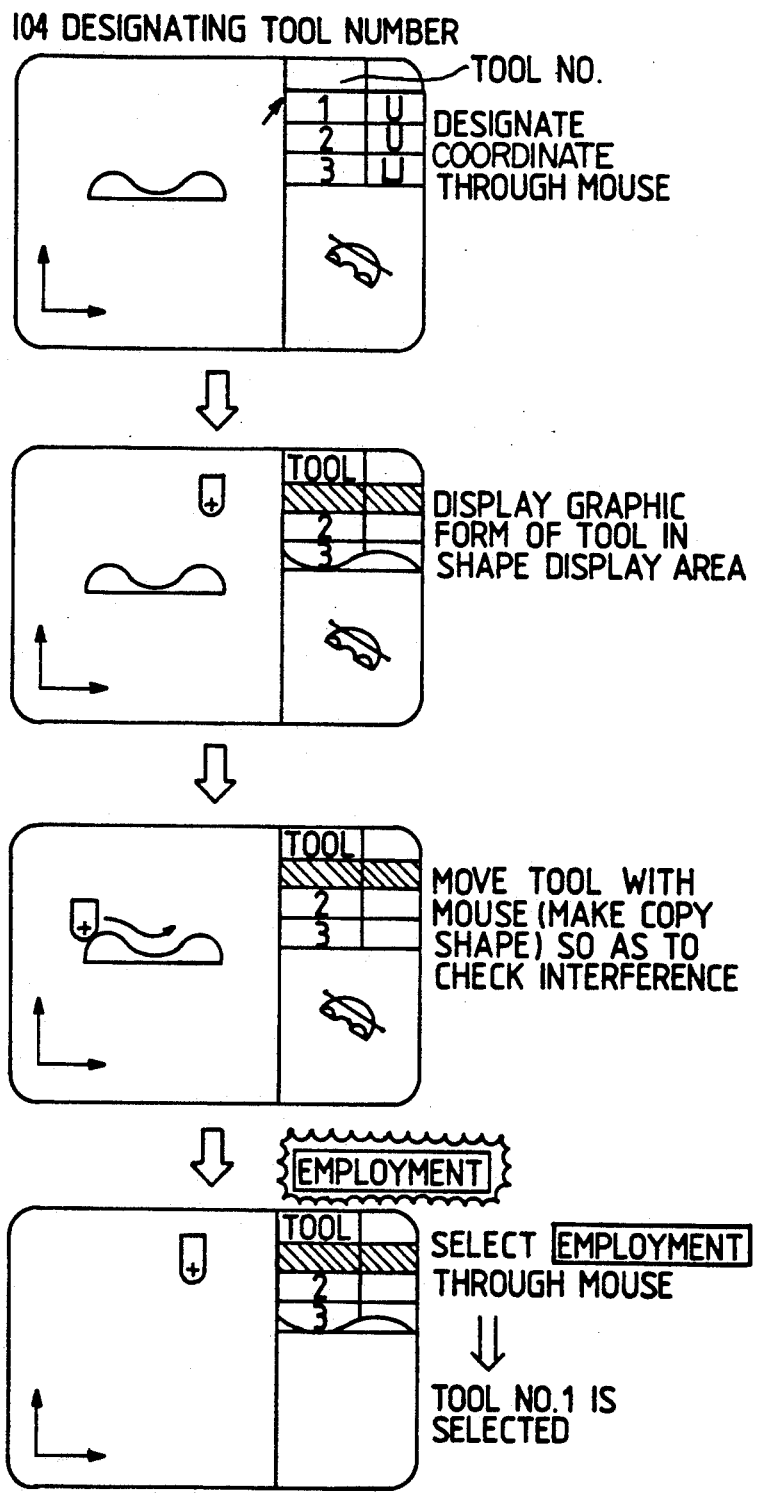
Figure 10D:
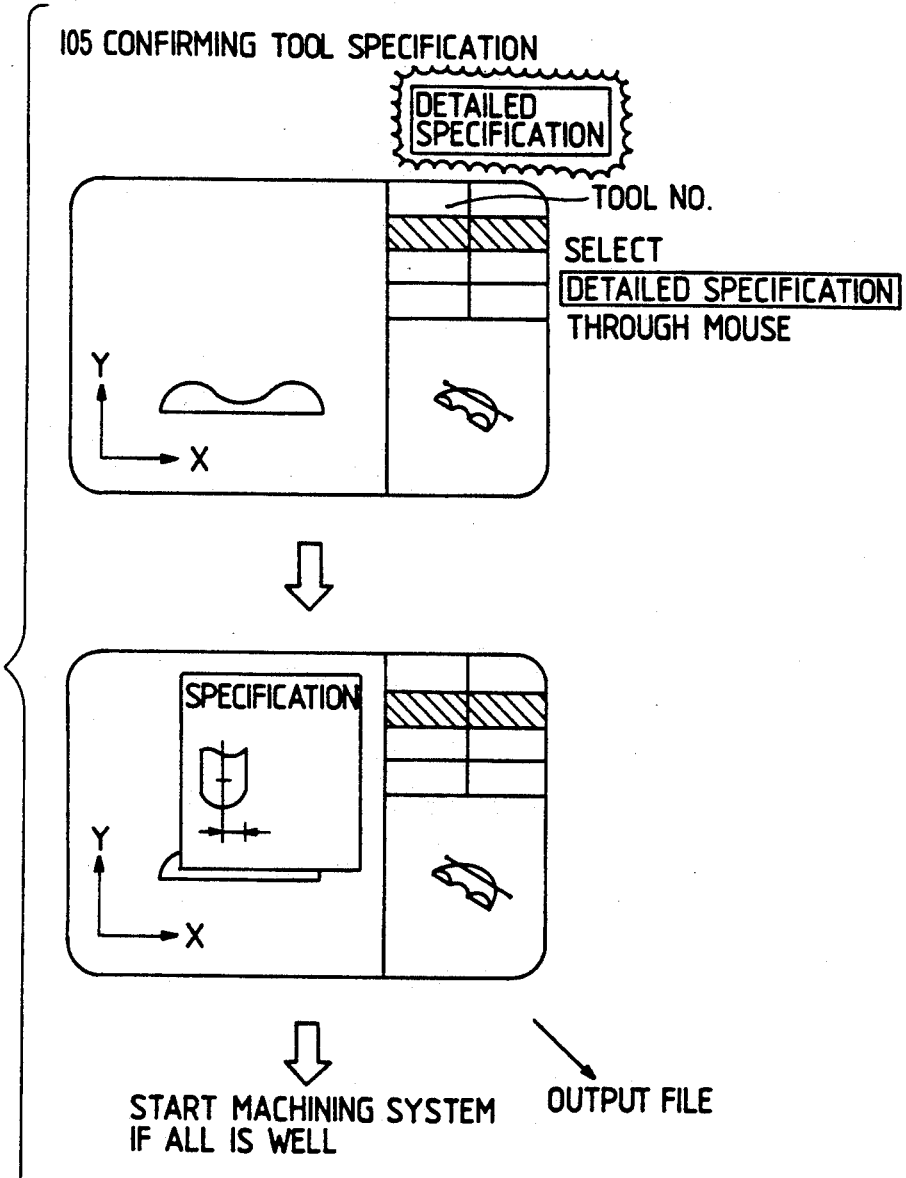

On the screen shown in FIG. 10A, a shape display area, a tool list display area, and a whole shape display area are provided. For display of shape data, a shape display function and a viewpoint change function (viewpoint change, zooming up) are provided. For selection of the tool shape, a tool list display function, a function for displaying a sectional view between points designated through a mouse for the displayed shape, a function for moving a selected graphic tool through the mouse on a displayed sectional view so as to check for interference of the product shape with the tool, and a function for displaying a list (graphics included) of specification (dimensions, parameters) for the employed tool so as to confirm the selected tool specification are provided.

Therefore, FIGS. 10A to 10D can be regarded as a tool selection interactive screen comprising the above functions. Next, the procedure for the fourth embodiment shown in FIGS. 10B to 10D will be described. The shape is displayed in Section 101 of FIG. 10B and, the viewpoint is changed when necessary in Section 102. The sectional view is displayed in Section 103 and the appropriate tool number is designated through the mouse in Section 104 of FIG. 10C. The tool graphic is displayed in the shape display area, the tool is moved through the mouse, and whether the product shape interferes with the tool is checked by allowing the tool to trace the tool graphic shape. If all is well, the tool number is selected. Next, so as to confirm the tool specification in Section 105 of FIG. 10D, the contents of the tool specification are specified through the mouse, and the specification is displayed. If all is well, the machining system is started.

Next, as to 2½ or less dimensional machining (mainly boring), the fifth embodiment will be described with reference to FIGS. 11 and 12. In this case, data of a plurality of tools of many types is registered in a file and read from the CAM system at a high speed.

Figure 11:
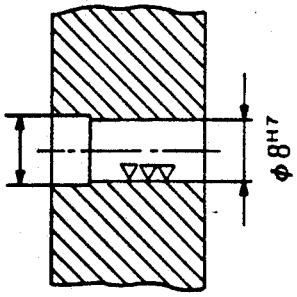
FIG. 11 is a diagram of machining hole tool selection.

In FIG. 11, the vertical axis represents the type of a machining hole and the horizontal axis represents the type of a tool, and the table is used to determine tools to be employed. The table shows, for example, that for a finishing machining of a general hole of the circular hole type by inner periphery machining, a center drill, a drill, and a reamer are used. Like this, tools can be selected from the relationship between the machining type and tools to be used. The relationship can be registered on a computer program.

As an example of FIG. 12, for machining a hole in a die plate, a table, which can be used to determine whether finishing machining or a finishing allowance is required from the relationship between the die plate type which is represented by the vertical axis and the corresponding hole type for a guide post or a clamp bolt which is represented by the horizontal axis, is created. The table shows, for example, that there are a guide post hole requiring a finishing allowance and holes requiring finishing machining for a sub-guide post, plate clamp bolt, knock pin, pilot unit, guide pin, lifter pin, misfeed detection unit, and round punch cutting edge in a lower dieset.

Finishing machining (a circle mark) means that holes are machined by a center drill, drill, and reamer, and finishing allowance required (a Δ mark) means that a workpiece is machined with a finishing allowance left and then ground.

Figure 13A:
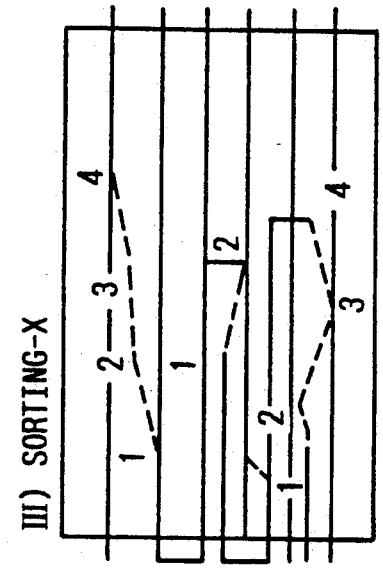
FIGS. 13A to 13C are schematic for deciding the machining order for machining holes.
Figure 13B:
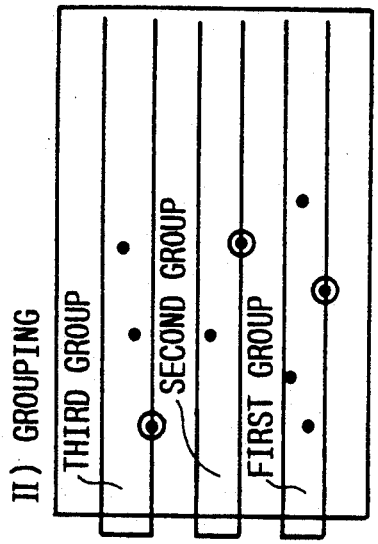
Figure 13C:
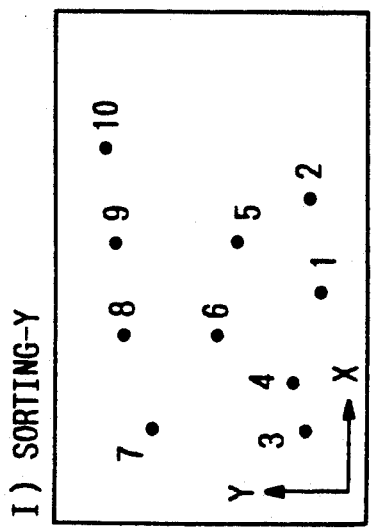
Figure 14:
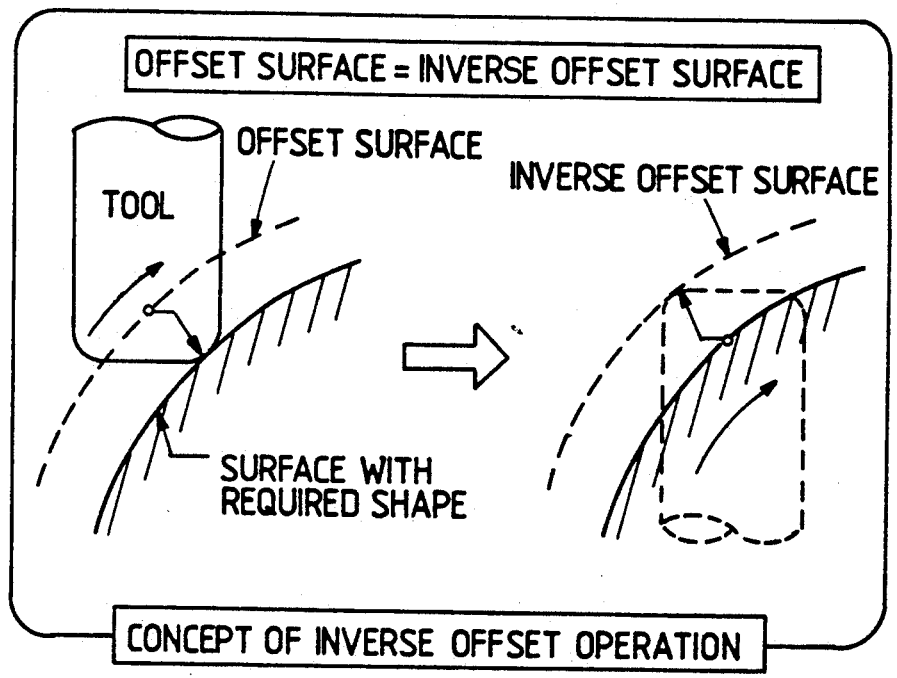
FIG. 14 is an illustration for the concept of the inverse offset operation which is a prior art.

FIGS. 13A to 13C are drawings for deciding the machining order for machining holes. A method for deciding the boring order for boring a plurality of holes with the same diameter on a two-dimensional flat plate effectively with accuracy is specified. However, this method is a preliminary operation for eliminating a backlash of a tool (the tool is operated only in one direction but not in the opposite direction) and minimizing the tool path.

As shown in FIG. 13A, X and Y coordinates are set on the plate surface, and the coordinate values of hole center positions are numbered starting at the smallest value (1, 2, —, 9, 10). Next, as shown in FIG. 13B, the coordinate values are grouped so that some of them are within a certain tolerable range in the Y axis. In this example, they are divided into three groups. Next, the coordinate values in each group are numbered starting at the smallest X coordinate value as shown in FIG. 13C (1, 2, 3, and 4 in the first group, 1 and 2 in the second group, and 1, 2, 3, and 4 in the third group).

Holes can be bored with no backlash in the above order extremely efficiently with high accuracy.

According to the present invention, offset surfaces are generated in correspondence with various types of tools by a machining information processing system and a tool path which allows tool interference avoidance processing can be generated. By the offset surface correction method which can solve the conventional problem of reduction in accuracy using the inverse offset method, a problem of over cutting is solved. Since lattice memories can be reduced, it is possible to realize a sculptured surface machining system by a personal computer or a work station. By selecting tools corresponding to a required shape, efficient machining is available.

We claim:

1. A method for machining a sculptured surface, the method comprising the steps of:

inputting surface data produced in accordance with a design and defining a desired sculptured surface to be produced by machining;

confirming no interference between a sectional shape of said sculptured surface to be produced and a shape of a selected tool on an interactive screen, said sectional shape of said sculptured surface to be produced and said shape of the selected tool being displayed on said interactive screen, and employing the selected tool;

generating a first offset surface by an inverse offset method in which an imaginary tool inverse to a sculptured surface having the required shape is moved, in terms of setting a point machining as a minimum machining unit of shape machining, setting an inverse tool shape as an offset surface for the point machining, and defining an enveloping surface of the offset surface for the point machining as an offset surface for a surface machining;

generating a second offset surface by a correcting operation in which a Z-coordinate value of a center point of the selected tool is obtained by calculating coordinate values from a machine point on said sculptured surface having the required shape to the center point of the selected tool, said Z coordinate axis being defined along a center axis of the selected tool, the obtained Z coordinate value of the center point of the selected tool is compared with a Z coordinate value of the first offset surface, and the larger Z coordinate value is employed as the Z coordinate value for correcting said first offset surface so that the second offset surface is generated;

generating a tool path in accordance with said second offset surface and at least one of inputted machining conditions including a cutting speed, an initial position of the selected tool and machining mode; and converting data of said tool path into numerical control information by a post processor.

2. A method for machining a sculptured surface according to claim 1, wherein the steps of generating of the first and second offset surfaces are eliminated when offset surface data is provided, and wherein cutter location data is outputted through the step of generating a tool path in dependence upon data relating to a given offset surface.

3. A method for machining a sculptured surface according to claim 1, wherein an area which does not participate in either of said first or second offset surface is determined as an invalid space and is not registered in a memory.

4. A method for machining a sculptured surface according to claim 3, wherein a lattice pitch in said memory is either one of wider or narrower in dependence upon a shape of either the first or second offset surface.

5. A method for machining a sculptured surface according to claim 4, wherein a tool type and dimensions thereof are changed in dependence upon the lattice pitch.

6. A method for machining a sculptured surface according to claim 5, wherein the sculptured surface is a Bezier surface having a convex hull polyhedron at control points of the sculptured surface, and wherein for a flat shape, the selected tool has a large diameter and, for an uneven surface, the selected tool has a diameter corresponding to the selected unevenness of the uneven surface.

* * * * *